United States Patent
Bisbal et al.

(10) Patent No.: US 10,767,317 B2
(45) Date of Patent: Sep. 8, 2020

(54) METHOD AND TREATMENT SYSTEM FOR MAKING OF PAPER

(71) Applicant: KEMIRA OYJ, Helsinki (FI)

(72) Inventors: Josep Lluis Bisbal, Barcelona (ES); Daniel Nuno da Rita Santos, Santa Maria da Feira (PT); Matti Hietaniemi, Espoo (FI)

(73) Assignee: KEMIRA OYJ, Helsinki (FI)

( * ) Notice: Subject to any disclaimer, the term of this patent is extended or adjusted under 35 U.S.C. 154(b) by 99 days.

(21) Appl. No.: 16/093,982

(22) PCT Filed: May 19, 2017

(86) PCT No.: PCT/EP2017/062072
§ 371 (c)(1),
(2) Date: Oct. 16, 2018

(87) PCT Pub. No.: WO2017/198804
PCT Pub. Date: Nov. 23, 2017

(65) Prior Publication Data
US 2019/0119857 A1    Apr. 25, 2019

(30) Foreign Application Priority Data
May 20, 2016 (EP) .................................. 16170565

(51) Int. Cl.
| | | |
|---|---|---|
| *D21H 27/30* | (2006.01) | |
| *D21H 17/42* | (2006.01) | |
| *D21H 17/44* | (2006.01) | |
| *D21H 17/68* | (2006.01) | |
| *D21H 21/16* | (2006.01) | |
| *D21H 17/63* | (2006.01) | |
| *D21H 11/02* | (2006.01) | |
| *D21H 11/22* | (2006.01) | |

(52) U.S. Cl.
CPC ............. *D21H 27/30* (2013.01); *D21H 11/02* (2013.01); *D21H 11/22* (2013.01); *D21H 17/42* (2013.01); *D21H 17/44* (2013.01); *D21H 17/63* (2013.01); *D21H 17/68* (2013.01); *D21H 21/16* (2013.01)

(58) Field of Classification Search
USPC ........................................................ 162/123
See application file for complete search history.

(56) References Cited

U.S. PATENT DOCUMENTS

2013/0180680 A1    7/2013    Axrup et al.

FOREIGN PATENT DOCUMENTS

| EP | 1918455 A1 | 5/2008 |
|---|---|---|
| WO | 2012168204 A1 | 12/2012 |
| WO | 2016027006 A1 | 2/2016 |
| WO | 2016034776 A1 | 3/2016 |

OTHER PUBLICATIONS

Chilean Patent Office, Office action of Chilean patent application No. CL2018003102, dated Jun. 17, 2019, 4 pages.
European Patent Office, Search Report of EP16170565.2, dated Oct. 31, 2016, Munich, 3 pages.

*Primary Examiner* — Mark Halpern
(74) *Attorney, Agent, or Firm* — Berggren LLP

(57) ABSTRACT

The invention relates to a method and treatment system for making of paper or surface ply of a multi-ply board from a fibre suspension, where at least 90 weight-% of fibres originate from chemical pulping process, chemi-thereto mechanical pulping process and/or office waste deinking pulping process. The fibre suspension further comprises inorganic mineral particles and cationic starch. A cationic copolymer of acrylamide and cationic monomers is incorporated to the fibre suspension and it is allowed to interact by flocculation with at least some of the said components of the fibre suspension. An anionic copolymer of acrylamide and more than 30 mol-% of anionic monomers is added to the fibre suspension, and fibre suspension is formed into a fibre web and drying the web to a dryness of at least 80%. An aqueous surface composition comprising polymeric binder is applied on the surface of the web.

Figure 1A:
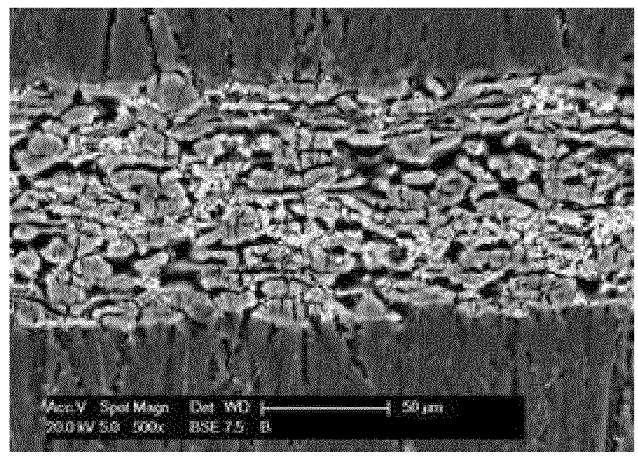

20 Claims, 1 Drawing Sheet

METHOD AND TREATMENT SYSTEM FOR MAKING OF PAPER

PRIORITY

This application is a U.S national application of the international application number PCT/EP2017/062072 filed on May 19, 2017 and claiming priority of European application No. EP16170565.2 filed on May 20, 2016 the contents of all of which are incorporated herein by reference.

The present invention relates to a method and treatment system for making of paper according to the preambles of enclosed independent claims.

The manufacturing process of paper, as well as the properties of produced paper may be improved by addition of various chemicals to the fibre suspension before formation of the paper web and/or by addition of surface compositions on the formed fibre web. For example, different chemicals, which are added to the fibre suspension before the formation of the paper web, are used to aid the retention of filler particles to the web, as well as to improve the drainage of water away from the web. However, it has been observed that in spite of chemical addition(s) the filler distribution in the formed paper web may be non-uniform, even if the obtained filler retention may be good. Uneven filler distribution may lead problems in subsequent surface treatment or deteriorate the optical and/or visual quality of the produced paper and/or its printing properties. Furthermore, uneven filler distribution may decrease the z-directional strength, i.e. Scott bond, of the formed paper.

As the inorganic mineral fillers are generally cheaper raw materials than fibres there is an interest to increase the amount of inorganic fillers in the fibre suspensions for making of paper or board. One of the challenges in increasing the filler content in the paper is to avoid dusting of the inorganic filler particles from dried paper. Furthermore, it is difficult to achieve uniform filler distribution and thus high dry strength, such as tensile and Scott bond, when the filler content in paper is increased.

The properties of the paper may be also affected by applying a surface composition, such as surface size or coating composition, on the surface of the paper web after drying of the web. The applied surface composition changes the properties of the paper, such as its porosity or surface strength. Sometimes, however, large amounts of surface composition may be needed in order to obtain the desired change in one or several properties. This may be process-wise problematic and economically unfeasible.

The object of the present invention is to minimize or even eliminate the disadvantages existing in the prior art.

An object of the invention is to provide a method and treatment system with which the uniform distribution of the filler in the paper web is improved.

Another object of the invention is to provide a method and a treatment system that enhances the effect obtainable with a surface composition.

A yet another object of the invention is a method and a treatment system that provides high quality fine paper, especially with high filler content A further object of the invention is a method and a treatment system that reduces dusting of the final paper web.

These objects are attained with the invention having the characteristics presented below in the characterising parts of the independent claims. Some preferable embodiments are disclosed in the dependent claims. All the described embodiments and advantages apply both for the treatment system and the method according to the present invention, when applicable, even if not always explicitly stated so.

A typical method for making of paper or surface ply of a multi-ply board from a fibre suspension, where at least 90 weight-% of fibres originate from chemical pulping process, chemi-thermo mechanical pulping process and/or office waste deinking pulping process, the fibre suspension further comprising inorganic mineral particles and cationic starch, the method comprises
- incorporating to the fibre suspension a cationic copolymer, formed of acrylamide and cationic monomers, and allowing it to interact by flocculation with at least some of the said components of the fibre suspension,
- adding to the fibre suspension an anionic copolymer, formed of acrylamide and more than 30 mol-% of anionic monomers,
- forming fibre suspension into a fibre web and drying the web to a dryness of at least 80%, and
- applying an aqueous surface composition comprising polymeric binder on the surface of the web.

Typical treatment system for making of paper or surface ply of a multi-ply board from a fibre suspension, where at least 90 weight-% of fibres originate from chemical, chemi-thermo mechanical pulping process and/or office waste deinking pulping process, wherein the system comprises
- a suspension component, which is incorporated into the fibre suspension and which comprises at least the following
  (a) cationic starch, which is incorporated into the fibre suspension,
  (b) a cationic copolymer of acrylamide and cationic monomers,
  (c) an anionic copolymer of acrylamide and more than 30 mol-% of anionic monomers; and
- a surface component, which is applied on the surface of the paper and which comprises an aqueous surface composition comprising a polymeric binder.

Now it has been surprisingly found that by using the treatment system according to the present invention it is possible to produce high quality fine paper, especially with high filler content. It has been observed that the filler particles are more uniformly distributed over the cross section of the paper web, which improves the optical properties of the final paper. Further, it has been noticed an enhanced binding of the filler particles to the base paper, so the filler particles located in vicinity of the paper surface do not dust off. In this manner the formation of recesses or uneven zones on the paper surface is avoided or reduced. Lack of recesses results in lower consumption and even spread of the surface composition. This means that the performance of the surface composition is clearly improved so that the same applied amount of the surface composition provides improved strength properties or a lower applied amount of the surface composition provides conventional strength properties. Furthermore, the low dusting is beneficial in printing and in copying processes, as it reduces equipment problems and failures during printing/copying process and provides better printing quality.

Without wishing to be bound by any theory, it is assumed that the anionic copolymer of acrylamide, which possess high anionicity, provides improved interaction with the cationic components present in the fibre suspension. The cationic starch in the fibre suspension is bound to the fibres and/or stabilizes the optional internal size emulsion. The cationic copolymer of acrylamide provides for formation of homogenous filler flocs with small dimensions. The formed flocs are relatively small which improves their binding to the fibres present in suspension. It is assumed that the improved binding of the filler flocs to the fibres improve also the uniform distribution of the filler as well as reduces dusting of the final paper. The flocs may have a mean floc size at drainage less than 60 μm, preferably less than 40 μm, measured by focused beam reflectance measurement. It has been observed that flocculation of only filler particles together or with fines is not necessarily sufficient for obtaining uniform filler distribution and sufficient bonding to prevent the dusting of filler. Now it has been found that the filler flocs could be further flocculated and/or bonded with fibres. The present invention thus provides a suspension composition, which enables good interaction between the anionic copolymer of acrylamide and the cationic constituents, i.e. cationic starch and cationic copolymer of acrylamide. The interaction may be enhanced by optimizing the amount of the anionic groups, i.e. anionic monomers, in the anionic copolymer of acrylamide. Overall the invention provides for improved filler, starch and/or internal size retention, formation of homogeneous flocs, as well as uniform distribution of the retained flocs and filler. The controlled flocculation and effective binding with fibres also has a positive effect on strength and porosity of the formed paper, and thus to the dusting reduction obtainable with the surface composition.

The fibre suspension, from which the paper is manufactured, may comprise lignocellulosic fibres of which at least 90 weight-%, preferably at least 95 weight-%, originate from chemical pulping process and/or chemi-thermo mechanical pulping (CTMP) process and/or office waste deinking pulping process, calculated from total amount of fibre material in the fibre suspension. Fibres from chemical or CTMP pulping are preferable, because the amount of fines and/or anionic trash in the suspension can be minimised.

The fibre suspension further comprises inorganic mineral particles. The amount of inorganic mineral particles in the fibre suspension is such that it provides an ash content of at least 8 weight-%, preferably at least 15 weight-%, more preferably at least 22 weight-%. Standard ISO 1762, temperature 525° C., is used for ash content measurements. Inorganic mineral particles may selected from ground calcium carbonate, precipitated calcium carbonate, talc, clay, titanium dioxide or any mixture thereof, preferably precipitated calcium carbonate, talc, clay or any mixtures thereof, more preferably precipitated calcium carbonate. According to one preferred embodiment mineral particles comprise calcium carbonate, preferably precipitated calcium carbonate. Preferably at least a part of the inorganic particles in the fibre suspension has a cationic surface charge, which enhances their interaction with anionic polyacrylamide having relatively high anionic charge.

Precipitated calcium carbonate is preferable for paper for printing and/or writing because of its opacity, light scattering, brightness and good printing properties. However, it has been known that precipitated calcium carbonate filler may reduce the strength properties of paper and make the internal and/or surface sizing more challenging. These drawbacks may now be effectively reduced by the treatment system according to the present invention.

At least a part, or all, of the inorganic mineral particles may be added to the fibre suspension as filler particles. This means that the fibre suspension is free of mineral filler particles before their addition. Alternatively all, or in addition at least a part, of the inorganic mineral particles may originate from broke, which is repulped for obtaining the fibre suspension or the particles may originate from office waste deinking pulping process. In this case, the filler particles are not separately added to fibre suspension but are inherently present from the pulping of broke. According to one preferable embodiment, a part of the mineral filler particles are added to the fibre suspension and a part, typically lesser part, originate from repulped broke and/or office waste deinking pulping process.

Suspension component's individual constituents, i.e. cationic starch, cationic copolymer of acrylamide, anionic copolymer of acrylamide, which are more closely described in the following, may preferably be added or incorporated in the fibre suspension separately and individually from each other and preferably at different process locations. Alternatively, suspension component's cationic constituents, i.e. cationic starch and cationic copolymer of acrylamide, may be added as separately but simultaneously at the same process location or as a mixture. The cationic constituents are added separately from the anionic constituent, i.e. anionic copolymer of acrylamide.

In general, the cationic starch may be added in amount of 1-20 kg/ton, preferably 3-13 kg/ton, more preferably 5-10 kg/ton, and/or cationic copolymer of acrylamide may be added in amount of 30-1000 g/ton, preferably 100-500 g/ton, more preferably 150-250 g/ton, and/or anionic copolymer of acrylamide may be added in amount of 20-500 g/ton, preferably 30-100 g/ton, more preferably 50-75 g/ton. It has been observed that these addition amounts provide good effect both in regard of filler distribution as well as of application of the surface composition. For example, larger amount of cationic starch may lead to reduced drainage.

In the present context all amounts given as kg/ton, refers to kg/ton pulp, i.e. kg/ton fibre suspension, calculated from fibre suspension flow and consistency.

The fibre suspension comprises cationic starch, which is preferably incorporated into the fibre suspension before the incorporation or addition of the cationic copolymer of acrylamide, which is described more in detail later in the text. The cationic starch may be mainly or essentially incorporated into the fibre suspension as internal size. It is speculated that the cationic starch interacts with the negatively charged fibre surfaces. Cationic starch comprises cationic groups, such as quaternized ammonium groups. Degree of substitution DS, indicating the number of cationic groups in the starch on average per glucose unit, may be in the range of 0.025-0.05, preferably in the range of 0.03-0.04. It has been observed that this degree of substitution provides cationicity that enable sufficient and suitable interaction between the cationic starch and the anionic copolymer of acrylamide. Cationic starch, which may be used in the invention, may be any suitable non-degraded starch, preferably potato, corn or tapioca starch.

Furthermore, a cationic copolymer, which is formed of acrylamide and cationic monomers is incorporated to the fibre suspension, preferably after the cationic starch. The cationic copolymer is allowed to interact by flocculation with at least some of the components of the fibre suspension, especially with the filler particles.

The formed flocs are relatively small which improves their binding to the fibres present in suspension. It is assumed that the improved binding of the filler flocs to the fibres improve also the uniform distribution of the filler as well as reduces dusting of the final paper. The flocs may have a mean floc size at drainage less than 60 μm, preferably less than 40 μm, measured by focused beam reflectance measurement.

The cationic copolymer of acrylamide may be a copolymer of acrylamide and at least one cationic monomer selected from 2-(dimethylamino)ethylacrylate (ADAM), [2-

(acryloyloxy)ethyl] trimethylammonium chloride (ADAM-Cl), 2-(dimethylamino)-ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), and [3-(methacryloylamino)propyl] trimethylammonium chloride (MAPTAC). Preferably the cationic monomer may be selected from [2-(acryloyloxy) ethyl] trimethylammonium chloride (ADAM-Cl), [3-(acryloylamino)propyl] trimethylammonium chloride (APTAC), and [3-(methacryloylamino)propyl] trimethylammonium chloride (MAPTAC). More preferably the cationic monomer is [2-(acryloyloxy)ethyl] trimethylammonium chloride (ADAM-Cl).

The cationic copolymer of acrylamide may comprise at least 4 mol-%, preferably 4-15 mol-%, more preferably 5-11 mol-%, even more preferably 7-10 mol-% or sometimes even more preferably 5-9 mol-%, of structural units originating from cationic monomers. The defined amount of cationic monomer provides the cationic copolymer with a good affinity to the other components of the system, such as anionic copolymer, mineral filler or to the optional bentonite microparticles, and improves their retention and distribution in the formed fibre web.

The cationic copolymer of acrylamide is preferably added to the fibre suspension after the incorporation of cationic starch to the fibre suspension. Furthermore, the cationic copolymer of acrylamide is preferably added to the fibre suspension before the addition of an anionic copolymer of acrylamide and optional bentonite microparticles, described later in this text. In this way the strength enhancing effect of cationic starch and the dewatering effect of the anionic copolymer of acrylamide and the optional bentonite microparticles may be optimized, as well as filler retention.

An anionic copolymer formed of acrylamide and more than 30 mol-% of anionic monomers is added to the fibre suspension, preferably after the addition of the cationic copolymer. The anionic copolymer, which is suitable for use in the present invention, comprises a higher amount of structural units originating from anionic monomers than conventional. It is assumed that also the anionic copolymer enhances the filler retention and possibly also the retention of the cationic starch to the fibre web, which is formed from the fibre suspension.

The anionic copolymer of acrylamide may comprise more than 40 mol-% or at least 50 mol-% of structural units originating from anionic monomers. A preferred range for the amount of the anionic monomers is 45-70 mol-%, more preferred 50-65 mol-%. The anionicity which is thus obtained provides effective interaction with the cationic constituents of the treatment system, such as cationic starch and/or optional synthetic internal size.

The anionic copolymer of acrylamide may be a copolymer of acrylamide and at least one unsaturated mono- or dicarboxylic acid, such as acrylic acid, maleic acid, fumaric acid, itaconic acid or any salt thereof.

The anionic copolymer of acrylamide may have an intrinsic viscosity in the range of 1.3-15 dl/g. Intrinsic viscosity is measured in a known manner in 1N NaCl and 20 mM phosphate buffer, pH 7.5, at 25° C. by using an Ubbelohde capillary viscometer. The capillary selected is appropriate, and in the measurements of this application an Ubbelohde capillary viscometer with constant K=0.005228 was used. The intrinsic viscosity is assumed to the indicative of the molecular weight of the polymer, even if the possible cross-linking may influence the intrinsic viscosity valued obtained. The weight average molecular weight MW may be, for example, 3 000 000-20 000 000 g/mol. In general, the intrinsic viscosity as defined provides advantages in manufacturing process of paper, namely good drainage and filler retention, as well as improvements in final paper properties, such as low Cobb60 value and low dynamic penetration of water.

According to one embodiment of the invention the anionic copolymer of acrylamide may have an intrinsic viscosity in the range of 1.3-3.5 dl/g. It has been found out that this intrinsic viscosity provides enhanced sizing effect when the treatment system comprises a synthetic internal size, such as alkyl succinic anhydride (ASA) or alkyl ketene dimer (AKD), especially ASA.

According to another embodiment of the invention the anionic copolymer of acrylamide may have an intrinsic viscosity in the range of 5-10 dl/g. It has been found out that this intrinsic viscosity provides enhanced Scott bond strength, i.e. internal strength, of the obtained final paper.

The rheology of the anionic crosslinked copolymer of acrylamide may be defined by using a damping factor tan($\delta$), which describes viscoelastic properties of crosslinked polymers. Rheological properties may be influenced by the cross-linking, which affects the three-dimensional structure and thus the performance of the anionic copolymer of acrylamide. Tan($\delta$) is measured as follows: polymer sample is dissolved in deionized water, providing a concentration of 1.5 weight-%. The sample is mixed by tumbling for 2 h, whereafter it is sonicated for 15 min and allowed to relax at least overnight prior to the rheological analysis employing a strain controlled Anton Paar MCR 301 rheometer equipped with plate-plate geometry, 50 mm in diameter, with a 1 mm gap. Sample volume is 4 ml for the oscillation mode measurements. The temperature is controlled by the device peltier plate and kept on 20.0±0.1° C. The amplitude is chosen to 0.5 mrad on basis of the sample's behaviour during an amplitude sweep. The polymer solution's damping factor tan($\delta$) is obtained by measuring a frequency sweep employing the above an angular displacement of 0.5 mrad while sweeping from 0.005 to 5 Hz with a slope of 12 measurement points per decade. The elastic and loss modulus (G' and G") are recorded and used for calculating the polymer sample's damping factor expressed as tan($\delta$). Tan ($\delta$) is determined at 0.02 Hz frequency. Determination of tan($\delta$) at lower frequency is not suitable for this kind of polymer samples as the results are not reproducible at lower frequencies. According to one embodiment of the invention the anionic copolymer of acrylamide has a tan($\delta$) value in the range of 0.5-2.5, preferably 0.8-1.8.

The anionic copolymer of acrylamide may be an emulsion polymer or a dispersion polymer, the emulsion polymer being preferred. It is currently believed that the emulsion polymer may maintain its three dimensional structure in the fibre suspension and provide more effective interaction with the various cationic constituents of the treatment system.

The anionic copolymer of acrylamide may be a cross-linked anionic copolymer. The cross-linking agent used may be a polyfunctional monomer, such as methylenebisacrylamide, polyethyleneglycol dimethacrylate, n-vinyl acrylamide or the like. The amount of used cross-linking agent may be 2-1000 molar ppm based on initial monomer content, preferably 4-300 molar ppm, more preferably 12-250 molar ppm. It is possible to control the intrinsic viscosity of the anionic copolymer by cross-linking, as cross-linking seems to reduce the intrinsic viscosity of the copolymer. The interaction of the anionic copolymer with the other constituents of the treatment system and fibre suspension can be influenced by selecting a suitable degree of cross-linking. Use of cross-linked anionic copolymer may improve the Cobb60 values of the obtained final paper.

Further, inorganic bentonite microparticles may preferably be added to the fibre suspension. In this case the suspension component of the treatment system comprises in addition of the other constituents also inorganic bentonite microparticles. The addition of bentonite microparticles may be performed simultaneously but separately with the anionic copolymer of acrylamide, preferably after the last stage of mechanical shear before a headbox. Bentonite microparticles may be added in amount of 1.5-4 kg/ton, preferably 2-3 kg/ton. Bentonite microparticles further improve the binding of flocculated filler particles to the fibres.

The suspension component of the treatment system may further comprise a synthetic internal size stabilized with a cationic polymer, preferably with cationic starch. This means that the cationic starch of the suspension component, which is separately added to the fibre suspension, may be used to stabilise the synthetic internal size, or alternatively, the cationic starch which is added together with the synthetic internal size for stabilisation purpose forms a constituent in the treatment system according to the invention. According to one preferable embodiment of the invention the synthetic internal size is stabilized with cationic starch and the cationic starch is added to the fibre suspension together with the synthetic internal size. The synthetic internal size may be alkyl succinic anhydride (ASA) or alkyl ketene dimer (AKD), or any mixture thereof, preferably alkyl succinic acid (ASA). Alkyl ketene dimer (AKD) may comprise palmitic acid, stearic acid, oleic acid or any mixture thereof.

After the addition of the constituents of the suspension component of the treatment system, i.e. cationic starch, cationic copolymer and anionic copolymer, as well as the optional constituent(s), i.e. synthetic internal size and/or bentonite microparticles, to the fibre suspension, the fibre suspension is formed into a fibre web and the formed fibre web is dried to a dryness of at least 80%. The drying of the web is done by using conventional drying devices, such as heated cylinders, air-borne dryers, and the like.

After drying of the fibre web, the surface component of the treatment system is applied on the surface of the paper web. The surface component comprises an aqueous surface composition comprising a polymeric binder. The polymeric binder of the surface composition may be a synthetic polymeric binder or a natural polymeric binder, such as starch. The synthetic polymeric binder may be styrene butadiene or styrene acrylate. It has been found that the surface composition provides a synergetic effect when used as a part of a treatment system comprising the above described suspension components.

The surface composition may be a surface size composition. Surface size composition may comprise either degraded starch or synthetic latex as polymeric binder. The surface size composition may have a solids content of 5-15 weight-%, preferably 6-12 weight-%. According to one preferable embodiment the surface size composition is free from inorganic mineral filler particles. The surface size composition may be added on the surface of the fibre web in amount of 0.2-3 g/m$^2$/side, preferably 0.4-2 g/m$^2$/side, more preferably 0.5-1.5 g/m$^2$/side.

According to another embodiment of the present invention the surface composition may be a coating composition comprising inorganic mineral particles, preferably calcium carbonate particles. The solids content of the coating composition may be 20-75 weigh-%, preferably 30-65 weight-%. The polymeric binder in the coating composition is preferably a synthetic polymeric binder, e.g. styrene butadiene or styrene acrylate.

After application of the surface composition the fibre web is dried by using conventional drying devices, such as infrared dryers or airborne dryers.

The treatment system according to present invention is suitable for making of paper, preferably uncoated surface sized fine paper, or surface ply of a multi-ply board. The treatment system according to present invention is especially suitable for making of fine paper for printing and writing. Grammage on the produced paper may be 60-200 g/m$^2$, preferably 65-150 g/m$^2$, more preferably 70-95 g/m$^2$. The treatment system improves the runnability and reduces the risk for web breaks, which is advantageous when producing low grammage paper.

EXPERIMENTAL

Some embodiments of the invention are disclosed in the following non-limiting examples.

Chemicals used in Examples 1-3 are given in Table 1. The chemicals may be further diluted before dosage, e.g. by 5 times, to improve mixing

TABLE 1

Chemicals used in Examples 1-3.

| Abbreviation | Name and supplier/description | Composition | Dissolving Concentration % |
|---|---|---|---|
| Starch | Raisamyl 50021, Chemigate | Cationic potato starch | 2.5 |
| ASA | FennoSize AS 1000, Kemira | ASA emulsified to 2 parts of starch above | 1.25 |
| Starch2 | Raisamyl 70021, Chemigate | Cationic corn starch | 2.5 |
| AKD | FennoSize KD 360M, Kemira | AKD emulsion containing cationic degraded starch | 1.25 |
| PCC | Syncarb S 270 NY, Omya | Precipitated calcium carbonate | 35 |
| CPAM | 10 mol-% cationic; MW about 10M Da | Cationic polyacrylamide | 0.5 |
| Bentonite | FennoLite UK, Kemira | Montmorollonite clay, sieved | 3 |
| APAM-CR | 35 mol-% anionic, intrinsic viscosity 11 dl/g, tan(δ) 0.7 at 0.02 Hz | Anionic cross-linked polyacrylamide | 0.5 |
| APAM-CR0 | 75 mol-% anionic, intrinsic viscosity 3.9 dl/g tan(δ) 0.7 at 0.02 Hz | Anionic cross-linked polyacrylamide | 0.5 |

TABLE 1-continued

Chemicals used in Examples 1-3.

| Abbreviation | Name and supplier/description | Composition | Dissolving Concentration % |
|---|---|---|---|
| APAM-CR1 | 60 mol-% anionic, tan(δ) 1.4 at 0.02 Hz intrinsic viscosity 8 dl/g | Anionic cross-linked polyacrylamide | 0.5 |
| APAM-CR2 | 60 mol-% anionic, tan(δ) 1.3 at 0.02 Hz intrinsic viscosity 1.5 dl/g | Anionic cross-linked polyacrylamide | 0.5 |
| APAM-LIN | 60 mol-% anionic, intrinsic viscosity 11 dl/g | Anionic linear polyacrylamide | 0.5 |

Example 1

Pulp used in of Example 1 for the fibre suspension was mixing chest pulp from an uncoated fine paper mill using 90% bleached hardwood kraft pulp and 10% bleached soft wood kraft pulp. 20% dry dosage of precipitated calcium carbonate PCC (defined in Table 1) was added to the mixing chest pulp. The final fibre suspension for Example 1 was made by adding enough dilution water to this pulp and PCC mixture to reach a consistency of 9.2 g/l. Dilution water was blend of white water and clear filtrate in 50:50 ratio. Pulp and water properties are presented in Table 2.

TABLE 2

Pulp and water properties

|  | Mixing chest pulp | White water | Clear filtrate | Final fibre suspension |
|---|---|---|---|---|
| pH | 8.0 | 7.9 | 7.8 | 8.2 |
| Turbidity, NTU | 132 | 1 | 1 | 44 |
| Conductivity, mS/cm | 1.06 | 0.94 | 0.93 | 0.96 |
| Charge, μekv/l | −21.3 | −25.6 | −31.1 | NA |
| Zeta potential, mV | −18.2 | NA | NA | −16.5 |
| Consistency, g/l | 41.0 | 1.3 | 0.0 | 9.2 |
| Ash content, % | 21.5 | NA | NA | NA |

Dynamic drainage jar DDJ (Paper Research Materials Inc.) was used to test retention. Mixer speed in DDJ was 1200 rpm. Wire type was 40M in DDJ. At the drainage moment filtrate hose was opened and consistency was determined form the first 100 ml. Retention was calculated as 100%×(test pulp consistency−filtrate consistency)/test pulp consistency.

A Dynamic Drainage Analyzer, DDA, (AB Akribi Kemikonsulter, Sweden) was used to measure drainage. DDA's vacuum and stirrer were calibrated and necessary adjustments to the settings were made. DDA was connected to a computer for measuring the time between an application of vacuum and the vacuum break point. A change of the vacuum expresses the forming time of a wet fibre web until air breaks through the thickening web indicating the drainage time. A drainage time limit was set to 30 seconds for the measurements.

In drainage measurements, 500 ml of the fibre suspension sample was measured into the reaction jar. The drainage test was performed by mixing the sample suspension with the stirrer at 1200 rpm for 40 seconds while the chemicals to be tested were added in predetermined order. Test chemical addition times are indicated in Table 3 as negative time before the start of the drainage. Drainage test was using a wire with 0.25 mm openings. 300 mbar vacuum for 30 s after drainage was used. The sheets were dried in vacuum dryers for 10 minutes at 92° C. and at 1000 mbar. Before testing the DDA sheets were pre-conditioned for 24 h at 23° C. in 50% relative humidity, according to ISO 187. Cobb60 value was measured from the DDA sheets with 5 cm diameter Cobb device. Cobb60 measurement is based on ISO 535 "Paper and board—Determination of water absorptiveness—Cobb method", measurement with 60 s absorption time. Cobb60 value is compared to Cobb60 value of 0-test without chemicals (test 23) to calculate reduction.

Test program for DDA and DDJ test is given in Table 3. Time is the dosing time of chemical before the drainage moment. The chemical dosages are given in kg/ton dry.

TABLE 3

Test program for DDA and DDJ test.

| | Time, s | | | | | | | |
|---|---|---|---|---|---|---|---|---|
| | −40 | −40 | −20 | −10 | −10 | −10 | −10 | −10 |
| | | | | | Chemical | | | |
| test no. | Starch | ASA | CPAM | Bentonite | APAM-CR2 | APAM-CR1 | APAM-CR | APAM-CR0 |
| 1-1 | 7 | 1.2 | 0.2 | 2.2 | | | | |
| 1-2 | 7 | 1.2 | 0.2 | 2.2 | 0.03 | | | |
| 1-3 | 7 | 1.2 | 0.2 | 2.2 | 0.06 | | | |
| 1-4 | 7 | 1.2 | 0.2 | 2.2 | 0.09 | | | |
| 1-5 | 7 | 1.2 | 0.2 | 2.2 | | 0.03 | | |
| 1-6 | 7 | 1.2 | 0.2 | 2.2 | | 0.06 | | |
| 1-7 | 7 | 1.2 | 0.2 | 2.2 | | 0.09 | | |
| 1-8 | 7 | 1.2 | 0.2 | 2.2 | | | 0.03 | |
| 1-9 | 7 | 1.2 | 0.2 | 2.2 | | | 0.06 | |
| 1-10 | 7 | 1.2 | 0.2 | 2.2 | | | 0.09 | |

TABLE 3-continued

Test program for DDA and DDJ test.

| | Time, s | | | | | | | |
|---|---|---|---|---|---|---|---|---|
| | −40 | −40 | −20 | −10 | −10 | −10 | −10 | −10 |
| | | | | | Chemical | | | |
| test no. | Starch | ASA | CPAM | Bentonite | APAM-CR2 | APAM-CR1 | APAM-CR | APAM-CR0 |
| 1-11 | 7 | 1.2 | 0.2 | 2.2 | | | | 0.03 |
| 1-12 | 7 | 1.2 | 0.2 | 2.2 | | | | 0.06 |
| 1-13 | 7 | 1.2 | 0.2 | 2.2 | | | | 0.09 |
| 1-14 | 7 | — | 0.2 | 2.2 | 0.06 | | | |
| 1-15 | 7 | — | 0.2 | 2.2 | | 0.06 | | |
| 1-16 | 7 | — | 0.2 | 2.2 | | | | |
| 1-17 | 7 | — | 0.2 | 2.2 | | | 0.06 | |
| 1-18 | 7 | — | 0.2 | 2.2 | | | | 0.06 |
| 1-19 | 7 | 1.2 | 0.2 | | | | | |
| 1-20 | 7 | 1.2 | 0.2 | | | 0.03 | | |
| 1-21 | 7 | 1.2 | 0.2 | | | 0.06 | | |
| 1-22 | 7 | 1.2 | 0.2 | | | 0.09 | | |
| 1-23 (0-test) | 0 | | | | | | | |

Table 4 shows the sizing, drainage and retention results for treatment systems based on invention and for references. APAM-CR1 and APAM-CR2 have more anionic charge and they will give at least 89% Cobb60 reduction with all dosages 0.03, 0.06 and 0.09 kg/t, where reference products APAM-CR0 and APAM-CR give required Cobb60 reduction only with one dosage level. Invented system allows to control dosage level for drainage and retention. Short drainage time and high retention are achieved when APAM is used with CPAM. Drainage time and retention are further improved when bentonite is added to the system.

TABLE 4

Sizing, drainage and retention results.

| | Device | | |
|---|---|---|---|
| | DDA | DDA | DDJ |
| | | Measurement | |
| test no. | Cobb60 reduction % | Drainage times | Retention % |
| 1-1 | NA | 4 | 78 |
| 1-2 | 93 | 4 | 79 |
| 1-3 | 90 | 4 | 81 |
| 1-4 | 90 | 4 | 84 |
| 1-5 | 89 | 4 | 80 |
| 1-6 | 93 | 4 | 81 |
| 1-7 | 91 | 4 | 80 |
| 1-8 | 92 | 4 | 78 |
| 1-9 | 85 | 4 | 82 |
| 1-10 | 85 | 4 | 83 |
| 1-11 | 82 | 4 | 80 |
| 1-12 | 90 | 4 | 80 |
| 1-13 | 87 | 4 | 84 |
| 1-14 | 0 | 4 | 82 |
| 1-15 | 0 | 4 | 82 |
| 1-16 | 0 | 4 | 82 |
| 1-17 | 0 | 4 | 83 |
| 1-18 | 0 | 4 | 83 |
| 1-19 | 80 | 8 | 67 |
| 1-20 | 82 | 7 | 72 |
| 1-21 | 80 | 6 | 75 |
| 1-22 | 83 | 6 | 77 |
| 1-23 | 0 | 9 | 58 |

Example 2

Test pulp was made by refining 90% bleached eucalyptus hardwood pulp and 10% bleached pine kraft pulp in Voith Sulzer laboratory refiner to Canadian Standard Freeness of 370 ml. After refining the pulp was diluted to obtain fibre suspension having a consistency of 5.07 g/l with tap water. The conductivity of tap water was adjusted to 1175 µS/cm with $CaCl_2 \times 2H_2O$ 0.1 g/l+$Na_2SO_4$. pH of the fibre suspension was 7. 9. Consistency was measured according to ISO 4119 and conductivity with Knick Portamess 911 device.

Dynamic hand sheets were prepared by the equipment from Techpap. Drum was operated with 1400 rpm, mixer for pulp 400 rpm, pulp pump 800 rpm/min, number of sweeps 100 and scoop time was 60 s. Produced sheets were pressed in a Techpap roll press at 6 bar between blotting papers and dried restrained in a STFI plate dryer, 8 minutes at 140° C.

Chemical dosages, as kg/ton dry, to the fibre suspension are given in Table 5.

ASA-emulsion was prepared by mixing 2 parts of Starch2 to 1 part of ASA with an Osterizer household mixer equipped with a steel beaker to form a stable emulsion for 24 hours. ASA was dosed to the fibre suspension as emulsion. Active ASA dosages are given in Table 5.

Amount of Starch2 in Table 5 is the sum of Starch2 included in ASA emulsion and Starch2 added separately.

TABLE 5

Dosages and dosing times of chemicals in the Example 2.

| | Time, s | | | | | | | |
|---|---|---|---|---|---|---|---|---|
| | −80 | −65 | −45 | −35 | −20 | −10 | −10 | −10 |
| | Chemical | | | | | | | |
| test no. | Starch2 | ASA | PCC | CPAM | Bentonite | APAM-CR-2 | APAM-CR1 | APAM-LIN |
| 2-1 (reference) | 7.4 | 0.7 | 350 | 0.2 | 2.2 | | | |
| 2-2 | 7.4 | 0.7 | 350 | 0.2 | 2.2 | 0.05 | | |
| 2-3 | 7.4 | 0.7 | 350 | 0.2 | 2.2 | 0.10 | | |
| 2-4 | 7.4 | 0.7 | 350 | 0.2 | 2.2 | | 0.05 | |
| 2-5 | 7.4 | 0.7 | 350 | 0.2 | 2.2 | | 0.10 | |
| 2-6 | 7.4 | 0.7 | 350 | 0.2 | 2.2 | | | 0.05 |
| 2-7 (reference) | 7.4 | 0.7 | 350 | 0.2 | | | | |
| 2-8 | 7.4 | 0.7 | 350 | 0.2 | | 0.05 | | |

Dynamic hand sheets were surface sized. Surface sizing composition comprised:

Degraded nonionic starch 96.2% as dry: C*film 07311 cooked at 16% solids at 97° C. for 30 min;

Optical brightener agent 1.8% as product: Neucoblanc PSP by Igcar,

Sizing agent 2.0% as product: Impress 918 ST by Solenis;

Deionized water to dilute composition to 10% dry solids.

Surface size was applied on the hand sheets by using a size press. Size press manufacturer: Werner Mathis AG, CH 8155 Niederhasli/Zürich; Size press model: HF 47693 Type 350; Operation speed: 2 m/min; Operation pressure: 1 bar; Operation temperature: 60° C.; Sizing solution volume: 115 ml/test.

Drying of the surface sized sheets was made in one-cylinder felted steam heated dryer drum at 92° C. for 1 min. Shrinkage was restricted in dryer. Paper passed the dryer once. Size curing was made in oven: 105° C., 15 min.

Surface size pick-up was given as percentage increase of air conditioned basis weight of base paper and surface sized paper. Basis weight was measured with Mettler Toledo according to ISO 536.

Internal bond of surface sized hand sheets was measured by using Scott Bond value of Huygen equipment according to Tappi T 569.

Ash content of the hand sheets without surface sizing was measured according to ISO 1762, temperature 525° C., and tensile index for the hand sheets without surface sizing was calculated from machine direction tensile strength measurement, according to ISO 1924-3, indexed to sheet basis weight.

Results for Example 2 are presented in Table 6.

TABLE 6

Properties of hand sheets (tensile index, sheet ash) and surface sized hand sheets (Scott bond, pick-up)

| Test no | Tensile index Nm/g | Sheet Ash % | Scott bond J/m$^2$ | Pick-up % |
|---|---|---|---|---|
| 2-1 | 44 | 35 | 187 | 9.5 |
| 2-2 | 46 | 35 | 208 | 9.8 |
| 2-3 | 47 | 36 | 203 | 9.6 |
| 2-4 | 47 | 35 | 197 | 10.2 |
| 2-5 | 47 | 36 | 224 | 9.2 |
| 2-6 | 48 | 34 | 221 | 10.2 |
| 2-7 | 44 | 34 | 167 | 9.5 |
| 2-8 | 47 | 34 | 184 | 9.9 |

It can be seen from Table 6 that anionic copolymer of acrylamide (APAM) which was added to the fibre suspension improved tensile strength compared to references without APAM addition. Use of APAM together with microparticles of bentonite improved Scott bond strength compared to reference 2-1, comprising bentonite but no APAM. Addition of APAM without bentonite (test 2-8) improved Scott bond strength after surface sizing compared to reference 2-7. A higher dosage of APAM increased ash retention, which is indicated by higher sheet ash content in test 2-3 and test 2-5. Higher intrinsic viscosity of APAM (see test 2-4, 2-6) may influence the surface size pick-up. Further, APAMs may influence to sheet porosity and ASA retention, which further influences surface sizing.

Figure 1B:
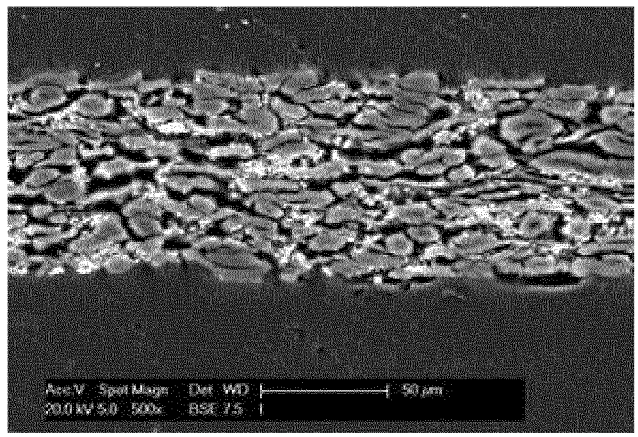

SEM pictures of sheet cross section were taken from resin embedded handsheets made with a gap former according to surface sized recipe of Test no 2-3 using anionic cross-linked polyacrylamide APAM-CR2 (FIG. 1a) and APAM-CR0 (FIG. 1b). From FIG. 1a it can be seen that the anionic cross-linked polyacrylamide APAM-CR2 provides flocs, which are relatively small, and the filler which is seen as white in the figure is well distributed throughout the sheet. From FIG. 1b it can be seen that the anionic cross-linked polyacrylamide APAM-CR0 provides flocs which are slightly bigger, and the filler is more concentrated in the centre of the sheet.

Example 3

Hand sheets were prepared and surface sized in the same manner as in Example 2. Dosages and dosing times for hand sheet preparation are expressed in Table 7. The chemical dosages are given in kg/ton dry, except PCC, which is given as dry.

TABLE 7

Dosages and dosing times of chemicals in Example 3.

| | Time, s | | | | | | | |
|---|---|---|---|---|---|---|---|---|
| −80 | −65 | −65 | −45 | −35 | −20 | −10 | −10 | −10 |
| | | | | | Chemical | | | |
| Test no. Starch2 | ASA | AKD | PCC | CPAM | Bentonite | APAM-CR2 | APAM-CR1 | APAM-LIN |
| 3-1  7.4 | 0.7 | | 35 | 0.2 | | | | |
| 3-2  7.4 | 0.7 | | 35 | 0.2 | | | 0.05 | |
| 3-3  7.4 | 0.7 | | 35 | 0.2 | 2.2 | 0.05 | | |
| 3-4  7.4 | 0.7 | | 35 | 0.2 | 2.2 | 0.10 | | |
| 3-5  7.4 | 0.7 | | 35 | 0.2 | 2.2 | | 0.05 | |
| 3-6  7.4 | 0.7 | | 35 | 0.2 | 2.2 | | 0.10 | |
| 3-7  7.4 | 0.7 | | 35 | 0.2 | 2.2 | | | 0.05 |
| 3-8  7.4 | 1.2 | | 35 | 0.2 | 2.2 | 0.05 | | |
| 3-9  7.4 | 1.2 | | 35 | 0.2 | 2.2 | | 0.05 | |
| 3-10 7.4 | 1.2 | | 35 | 0.2 | 2.2 | | | 0.05 |
| 3-11 7.4 | | 0.18 | 35 | 0.2 | 2.2 | 0.05 | | |
| 3-12 7.4 | | 0.45 | 35 | 0.2 | 2.2 | 0.05 | | |

Penetration tests PDA for measuring the handsheets in contact with water were made with Surface & Sizing Tester Mütec EST 12 (Emtec Electronic GMbH), according to operating instructions of the equipment. Transmittance was recorded at 0.2 s.

Cobb60 measurement was based on ISO 535 "Paper and board—Determination of water absorptiveness—Cobb method", measurement with 60 s absorption time.

Contact angle (FibroDat 1100, Goniometer PG3) was determined according to Tappi T 558 om-97. Contact angle was recorded at 1 s.

Fluorescence was measured with Elrepho spectrophotometer of Lorenzen & Wettre according to ISO 11475 based on fluorescence component of CIE Whiteness D65 from top side.

Results are presented in Table 8. Results are shown both for surface sized handsheet samples (according to the invention) and for handsheet samples without surface sizing (Base paper) in order to show that the obtained effect originates not only from the application of surface sizing, but also from the addition of the suspension composition chemicals to the fibre suspension. It can be seen that Cobb60 value is clearly improved after surface sizing. Further, PDA transmittance is improved by addition of bentonite microparticles and APAM-CR2 to the fibre suspension and application of a surface size (Test 3-3 vs. test 3-1). Contact angle of at least 90 deg was achieved for surface sized paper in tests 3-3 and 3-6 even with low dosage of ASA. Test 3-3 generally indicates good sizing performance even with low dosage of ASA and low dosage of low IV cross-linked APAM. AKD made good internal sizing based on Cobb60, but sized paper PDA value is lower even when pick-up is higher. Therefore ASA as internal size may be preferable in some embodiments of the invention. Fluorescence is higher in tests 3-3 and 3-5 compared to test 3-4 as well as in test 3-8 compared to test 3-9. This indicates that pick-up and fluorescence can be increased with low IV cross-linked APAM.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

TABLE 8

Properties of hand sheets.

| Test no. | Base Paper Cobb60 g/m² | Surface Sized Cobb60 g/m² | Base Paper PDA % | Surface Sized PDA % | Base Paper Contact angle deg | Surface Sized Contact angle deg | Surface Sized Pick-up % | Surface Sized Fluorescence % |
|---|---|---|---|---|---|---|---|---|
| 3-1* | 90 | 78 | 28 | 22 | 40 | 73 | 9.5 | 17.5 |
| 3-2 | 92 | 77 | 38 | 20 | 41 | 78 | 9.9 | 17.8 |
| 3-3 | 90 | 72 | 27 | 85 | 57 | 93 | 9.8 | 18.4 |
| 3-4 | 90 | 75 | 27 | 26 | 46 | 79 | 9.6 | 16.8 |
| 3-5 | 88 | 76 | 32 | 31 | 53 | 82 | 10.2 | 17.4 |
| 3-6 | 79 | 73 | 23 | 28 | 72 | 90 | 9.2 | 16.5 |
| 3-7 | 84 | 73 | 26 | 28 | 58 | 82 | 10.2 | 18.1 |
| 3-8 | 69 | 65 | 27 | 65 | 91 | 103 | 8.1 | 15.2 |
| 3-9 | 71 | 66 | 26 | 65 | 87 | 98 | 7.7 | 14.6 |
| 3-10 | 71 | 65 | 29 | 63 | 90 | 100 | 8.0 | 15.1 |
| 3-11 | 104 | 86 | 22 | 17 | 26 | 42 | 10.1 | 16.6 |
| 3-12 | 92 | 78 | 17 | 56 | 43 | 78 | 11.2 | 16.4 |

*Reference test point without anionic copolymer of acrylamide

The invention claimed is:

1. A method for making of paper or surface ply of a multi-ply board from a fibre suspension, where at least 90 weight-% of fibres originate from chemical pulping process, chemi-thermo mechanical pulping process and/or office waste deinking pulping process, the fibre suspension further comprising inorganic mineral particles and cationic starch, said method comprising:

incorporating a cationic copolymer of acrylamide and cationic monomers to the fibre suspension and allowing it to interact by flocculation with at least some of the components of the fibre suspension, adding an anionic copolymer of acrylamide and more than 30 mol-% of anionic monomers to the fibre suspension, forming the fibre suspension into a fibre web and drying the web to a dryness of at least 80%, and applying an aqueous surface composition comprising a polymeric binder on a surface of the web.

2. The method according to claim 1, wherein an amount of the inorganic mineral particles in the fibre suspension provides an ash content of at least 8 weight-%.

3. The method according to claim 1, wherein the inorganic mineral particles comprise calcium carbonate.

4. The method according to claim 1 further comprising:
adding the cationic starch in an amount of 1-20 kg/ton, and/or
adding the cationic copolymer of acrylamide in an amount of 30-1000 g/ton, and/or
adding the anionic copolymer of acrylamide in an amount of 20-500 g/ton.

5. The method according to claim 1, wherein the cationic starch, the cationic copolymer of acrylamide and the anionic copolymer of acrylamide in the fibre suspension are incorporated separately and individually from each other.

6. The method according to claim 1, wherein bentonite microparticles are added to the fibre suspension in an amount of 1.5-4 kg/ton.

7. The method according to claim 1, wherein bentonite microparticles are added to the fibre suspension simultaneously but separately with the anionic copolymer of acrylamide, after a last stage of mechanical shear before a headbox.

8. The method according to claim 1, wherein the cationic copolymer of acrylamide is added to the fibre suspension after incorporation of the cationic starch and before the addition of the anionic copolymer of acrylamide and optional bentonite microparticles.

9. A treatment system for making of paper or surface ply of a multi-ply board from a fibre suspension, wherein at least 90 weight-% of fibres originate from chemical, chemi-thermo mechanical pulping process and/or office waste deinking pulping process, the system comprising:

a suspension component, which is incorporated into the fibre suspension and which comprises at least the following:

(a) cationic starch, which is incorporated into the fibre suspension,
(b) a cationic copolymer of acrylamide and cationic monomers,
(c) an anionic copolymer of acrylamide and more than 30 mol-% of anionic monomers, and
a surface component, which is applied on a surface of the paper and which comprises an aqueous surface composition comprising a polymeric binder.

10. The treatment system according to claim 9, wherein the cationic copolymer of acrylamide is a copolymer of acrylamide and at least one cationic monomer selected from 2-(dimethylamino)ethylacrylate (ADAM), [2-(acryloyloxy) ethyl]trimethylammonium chloride (ADAM-Cl), 2-(dimethylamino)ethyl acrylate benzylchloride, 2-(dimethylamino) ethyl acrylate dimethylsulphate, 2-dimethylaminoethyl methacrylate (MADAM), [2-(methacryloyloxy)ethyl] trimethylammonium chloride (MADAM-Cl), 2-dimethylamino-ethyl methacrylate dimethylsulphate, [3-(acryloylamino) propyl]trimethylammonium chloride (APTAC) and [3-(methacryloylamino)propyl]trimethylammonium chloride (MAPTAC).

11. The treatment system according to claim 9, wherein the cationic copolymer is a cationic copolymer of acrylamide and at least 4 mol-% of cationic monomers.

12. The treatment system according to claim 9, wherein the anionic copolymer of acrylamide comprises more than 40 mol-%, of anionic monomers.

13. The treatment system according to claim 9, wherein the anionic copolymer of acrylamide has an intrinsic viscosity in a range of 1.3-3.5 dl/g.

14. The treatment system according to claim 9, wherein the anionic copolymer of acrylamide has an intrinsic viscosity in a range of 5-10 dl/g.

15. The treatment system according to claim 9, wherein the anionic copolymer of acrylamide has a tan($\delta$) value in a range of 0.5-2.5.

16. The treatment system according to claim 9, wherein the anionic copolymer of acrylamide is cross-linked anionic copolymer.

17. The treatment system according to claim 9, wherein the suspension component comprises further a synthetic internal size stabilized with a cationic polymer.

18. The treatment system according to claim 9, wherein the surface composition is a surface size composition comprising degraded starch as a polymeric binder.

19. The treatment system according to claim 9, wherein the suspension composition further comprises bentonite microparticles.

20. The treatment system according to claim 9, wherein the cationic copolymer is a cationic copolymer of acrylamide and 5-11 mol-%, of cationic monomers.

* * * * *